United States Patent

[11] 3,566,109

| [72] | Inventor | Robert D. Heidenreich<br>Madison, N.J. |
|---|---|---|
| [21] | Appl. No. | 705,810 |
| [22] | Filed | Feb. 15, 1968 |
| [45] | Patented | Feb. 23, 1971 |
| [73] | Assignee | Bell Telephone Laboratories Incorporated<br>Murray Hill, N.J. |

[54] ELECTRON MICROSCOPE METHOD AND APPARATUS FOR IMPROVING IMAGE PHASE CONTRAST
6 Claims, 3 Drawing Figs.

| [52] | U.S. Cl. | 250/49.5 |
|---|---|---|
| [51] | Int. Cl. | H01j 37/26,<br>G01n 23/04 |

[50] Field of Search............................................ 250/49.51,
49.54, 49.53

[56]   References Cited
   UNITED STATES PATENTS

| 2,802,110 | 8/1957 | Kazato et al. | 250/49.51 |
| 3,225,192 | 12/1965 | Katagiri et al. | 250/49.51 |
| 2,348,030 | 5/1944 | Snyder | 250/49.51 |

*Primary Examiner*—James W. Lawrence
*Assistant Examiner*—C. E. Church
*Attorneys*—R. J. Guenther and Edwin B. Cave

ABSTRACT: Superimposition of a critical amount of an a.c. component on the objective lens current of an electron microscope results in obtaining useful image contrast for object spacings below 10 angstroms.

PATENTED FEB 23 1971                     3,566,109

ELECTRON MICROSCOPE METHOD AND APPARATUS FOR IMPROVING IMAGE PHASE CONTRAST

BACKGROUND OF THE INVENTION

1. Field of the Invention

This invention relates to a method for improving the contrast of electron microscope images and to apparatus suitable for achieving improved contrast.

2. Description of the Prior Art

It has been said that the ultimate goal of electron microscopy is the ability to record images showing the atomic or molecular architecture of a solid object. This goal is based on the fact that very short electron wavelengths are obtainable, since such wavelengths determine the diffraction limited resolving power of electron microscopes according to the relationship $\delta = \dfrac{0.61\lambda}{\beta}$, where $\lambda$ is the wavelength and $\beta$ is the half-angle of the objective lens aperture. If this equation defined the only limitation on the recording of such images, then an objective lens aperture of about $5 \times 10\times^1$ radians, together with an electron wavelength of 0.37 angstroms, would result in a resolving power of about 0.4 angstroms. However, to reconstruct the molecular configuration, the objective lens must process scattered electron waves and do so without distortion.

At molecular distances the scattering power of the sample is so slight that at conditions near exact focus image contrast is too low to be useful. It is common practice, therefore to slightly defocus the objective lens for object spacings below 10angstroms, so that phase contrast becomes dominant in the formation of image contrast and results in a useful image.

Phase contrast is produced by the phase difference between electron waves which are scattered by the object relative to the transmitted wave. Under conditions of appropriate defocus such waves interact to produce recordable variations of image intensity, such variations being dependent on the defocus phase $\chi$ at the image plane of a ray scattered at angle $\beta$ relative to the axial ray according to the relationship, $$\chi = \frac{|\mathbf{K}|}{2}\Delta L_0 \beta^2 \qquad (1)$$

Control of phase contrast in electron microscope images is presently achieved by fine vernier control of the DC objective lens current. An incremental change $\delta J$ in lens current produces a corresponding increment of $\delta f$ in focal length and a focal separation in object space of $\Delta l_0$. $l_0$ is the distance from lens to conjugate object plane so as that $\Delta l_0$ is the axial separation of conjugate object plane and scattering specimen. The phase contrast in the image is given by the relationship, $$G_a \sin \chi = \sin \frac{|\mathbf{K}|}{2}\Delta L_0 \beta^2 \qquad (2)$$

ignoring spherical aberration, astigmatism and scattering phase shifts, for this purpose.

Unfortunately the achieving of optimum phase contrast images is also limited by lens aberrations, residual AC hum in the lens supplies, accelerating potential high tension, stray fields, and vibration, all of which act to distort the phase relationship at the image plane and thus limit the ability to reconstruct the image of molecular detail. Particularly bothersome is the presence of AC hum, otherwise referred to herein as residual ripple, both in the high tension and objective lens current in most electron microscope lens supplies. From the relationship given above between change in lens current and change in focal length of the objective lens, it is found that the result of residual ripple is a transverse oscillation of the image in the image plane, such oscillation causing a "smearing" of the image. It is difficult to control this smearing to the extent needed to achieve useful contrast for object spacing below about 5 angstroms.

SUMMARY OF THE INVENTION

The invention resides in the discovery that critically increasing the amplitude of an AC component on the objective lens current results in improved phase contrast.

The inventive apparatus is an electron microscope including a circuit having means for adjusting the amplitude of the AC component. Proper adjustment results in the optimizing of phase contrast for given object spacings of several angstroms to the extent that useful image contrast is obtained.

Optimizing of phase contrast includes both maximizing of phase contrast for some object spacing or alternatively minimizing of phase contrast for other object spacings

DETAILED DESCRIPTION

Proposed Model

Figure 1:
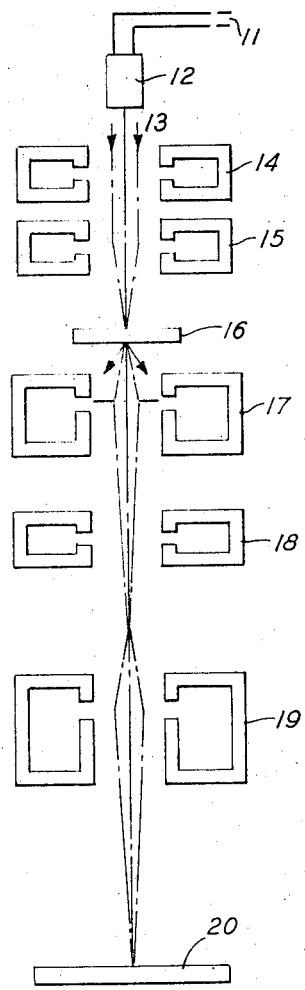
FIG. 1 shows a schematic arrangement of elements in a commonly used transmission electron microscope.

It will be appreciated that the actual physical interaction of electrons in the microscope which gives rise to the phenomenon described above is of such complexity as to be difficult of visualization. It will further be appreciated that attempts to describe such a phenomenon mathematically will ordinarily lead to a certain degree of oversimplification. With these limitations in mind, the following model is set forth merely as an aid to understanding the invention.

For a particular object in the form of a periodic grating of period $a_0$, an electron diffraction pattern occurs at the back focal plane of the electron microscope objective lens. The diffraction maxima can be considered as giving rise to a Young interference pattern at the objective lens image plane. The spacing of the diffraction peaks in the back focal plane is approximately $f\,\dfrac{\lambda}{a_0}$ for a lens of focal length $f$. For a ripple-free lens current and a condition of exact focus, the intensity of electron radiation at the image plane is ideally given by the following expression, $$|\psi_x|^2 = |C_1|^2 + |C_2|^2 + 2C_1 C_2 \sin K_x \beta,$$
$$= |C_1|^2 + |C_2|^2 + 2C_1 C_2 \sin 2\pi \frac{x}{2} \qquad (3)$$

where $|\Psi_x|^2$ is the intensity at a given distance $x$ along the image plane $C_1$ and $C_2$ are the intensities of two rays, each from a point in the back focal plane and interacting at the image plane. K is equal to $2\pi/\lambda$ where $\lambda$ is the wavelength of the diffracted ray, and $\beta$ is the angle of diffraction of the diffracted rays which $\beta_0 =$ on the Bragg condition for small angles $\beta_0$ such that $\beta_0 \approx \sin \beta_0$.

If a phase difference $\chi$ is now introduced between the two rays in equation (3), the intensity at distance $X$ from the origin in the image plane is, $$|\psi_x|^2 = |C_1|^2 + |C_2|^2 + 2C_1 C_2 \left[ \sin 2\pi \frac{x}{a_0} \cos \chi + \cos 2\pi \frac{x}{a_0} \sin \chi \right] \qquad (4)$$

The intensity distribution in the image plane is periodic with period $a_0 M$ if the magnification due to the lens is M and is simply a magnified representation of the original object. The contrast in this image is determined by $\chi$ since the greatest intensity variation occurs between $$x = \frac{a}{2} \text{ and } x = a_0 \text{ in } (4)$$

The relative magnitude or contrast of the spacing $a_0$ is then $$G = 4c_1 c_2 \sin \chi. \qquad (5)$$

For a condition where $\chi$ is determined only by defocus it will be recalled that $$\chi = \frac{|K|}{2} \Delta L_o \beta^2 \qquad (1)$$

so that (5) and (2) are equivalent.

In practical power supplies which produce direct current for the lenses by rectifying the 60cycle AC available, there is always a residual ripple due to imperfect filtering. This AC component acts on the model just described by producing a small oscillation in the separation $f \lambda / a_o$ between diffraction maxima in the back focal plane due to an oscillation in the focal length $f$. The oscillation in $f$ about its mean value results in an oscillation in the focal separation $\Delta L_0$ so that at a given instant, the focal separation is $$\Delta L_0 + \Phi_0 \sin \omega t \qquad (6)$$

where $\Phi_0$ is the amplitude of the oscillation and $\omega$ the frequency (60 cycle in this case) and $t$ is the time. The amplitude $\Phi_0$ is related to the chromatic aberration coefficient $C_{ch}$ of the objective lens and the AC current amplitude in the lens by the expression $$\Phi_o \simeq -2C_{ch} \frac{\Delta J}{J} \qquad (7)$$

where $J$ is the DC current and $\Delta J$ the oscillating or ripple amplitude.

When the ripple term $\Phi_0 \sin \omega t$ in (6) is introduced into (5) since now $$\chi = \frac{|K|}{2} [\Delta L_o + \Phi_o \sin \omega t] \beta^2$$

it is seen that the phase contrast $G$ is now time dependent. Since the time $t$ required to produce a photographic record of the image is much longer (2—10 secs.) than the period of the 60cycle ripple, what is recorded is a time average phase contrast. If this averaging is carried out the result is $$<G>_t = 4C_1 C_2 J_o \left( \frac{|K|}{2} \Phi_o \beta^2 \right) = 4C_1 C_2 J_o \left( \pi \Phi_o \frac{\lambda}{a_o^2} \right) \qquad (8)$$

This result can be visualized in terms of the Young interference model as a time variation in the angle $\beta$ in equation (3) or more specifically.

$$\beta = \mathbf{0} \pm \alpha(t) = \beta_0 \pm \alpha_0 \sin \omega t \qquad (9)$$

with $\alpha(t)$ the time dependent angular change from the value $\beta_0$. The effect of $\alpha(t)$ is to oscillate the period of the image of the grating about a mean value $a_0$ which can blur or smear out the spacing $a_0$ to the extent that it is "invisible." The time average thus amounts to adding a large number of grating images, the final result of which will depend upon the magnitude $\alpha_0$ of the ripple. This net effect is described by the Bessel function $J_0$ $$\left( \pi \Phi_o \frac{\lambda}{a_o^2} \right)$$

of (8) which relates the spacing $a_0$ directly to the ripple amplitude $\Phi_0$. That is, for maximum phase contrast with ripple present in the objective lens, $\Phi_0$ should be selected for a given distance $a_0$ to be imaged such that the Bessel function has a relative maxima or minima.

It will now be appreciated that according to this proposed model the phase contrast image which has been blurred by the presence of the residual ripple may be "brought back" or optimized by increasing the amplitude of the ripple to a value which corresponds to a peak on the Bessel curve. Such result corresponds to what has been observed in that increasing $\alpha$ or $\Phi_o$ by means of increasing the amplitude of the ripple causes the image to both "come and go," but at successively smaller levels of absolute contrast.

The Circuit

The circuit must be one capable of producing a periodic variation in the objective lens current and of varying the amplitude of this periodic variation. Such may be accomplished by impressing a separate AC voltage across the input terminals of the lens or by incorporating a variable reactance element in the filtering system of the DC power supply, for example, a variable capacitance to ground. It is not required that the periodic wave be in phase with the residual ripple. In fact, a possible advantage may be realized by causing the residual and impressed waves to be out of phase since the possibility then exists for the impressed wave to reduce or completely cancel the residual wave.

The AC wave may be of any shape, for example, a sine wave, square wave, sawtooth wave or wave produced by a half or full wave rectifier. However, any advantage gained by use of waves exhibiting rapid rise times, such as square waves, may be limited due to the high inductance in the objective lens current. The frequency of this wave may be such that several cycles are achieved during the time for exposure of the image on a photographic plate, but must be such that at least 10 cycles are achieved during the exposure time. For commonly used exposure times, for example, from 2 to 10 seconds, a frequency of from 10 to 200 cycles per second constitutes a preferred working range, below which little is gained in the achievement of a sharp image. Above this range it is probable that the lens will not respond due to the high inductance.

The amplitude of the AC wave should be large enough to affect the residual ripple (where the means for adjusting the amplitude is a variable reactance in the filtering system of the DC power supply, the residual ripple corresponds to that present for conditions of optimum filtering of AC from the input), but in any case should not exceed that produced by an injection of 30 millivolts into the lens current, since such would cause rotation of the image about an axis normal to the plane thereof, resulting in blurring.

In the obtaining of useful contrast for given object spacings, it is ordinarily preferred to increase the AC amplitude to the extent required to reach the first "peak" of maximum phase contrast which is not masked out by the residual ripple. However, it will be found that moving to one of the next peaks may result in the minimizing of phase contrast for other object spacings, which may be preferred for the removal of unwanted detail or to make the object spacing of interest more prominent. Such advantage is achieved, however, at the expense of a loss in absolute value of phase contrast.

Method of Operation

Constant variations occur in mechanical and electrical parameters which are critical for the obtaining of useful images for the object spacings of interest. Such variations require constant adjustment of such parameters and makes preferable their continuous monitoring. For example, a certain amount of drift, as well as ripple, is present in the accelerating potential and lens current. Accordingly, while optimum phase contrast is theoretically predictable from the injection of calculated amplitudes of ripple, it is practically achieved only by the injection of varying amplitudes until optimum contrast is achieved. Since the accelerating potential is also subject to residual ripple, the injected amplitude $\Phi_o$ represents in practice to bring the net ripple of the system to an optimum value.

Referring now to the drawing FIG. 1 shows a schematic arrangement of elements in a transmission electron microscope, where leads 11 bring an accelerating potential to the electron source or gun 12. The gun 12 directs a stream of electrons 13 through the remaining elements, including condenser lenses 14 and 15, specimen chamber 16, objective lens 17, intermediate (projector) lens 18, projector lens 19, and viewing and recording chamber 20.

Figure 2:
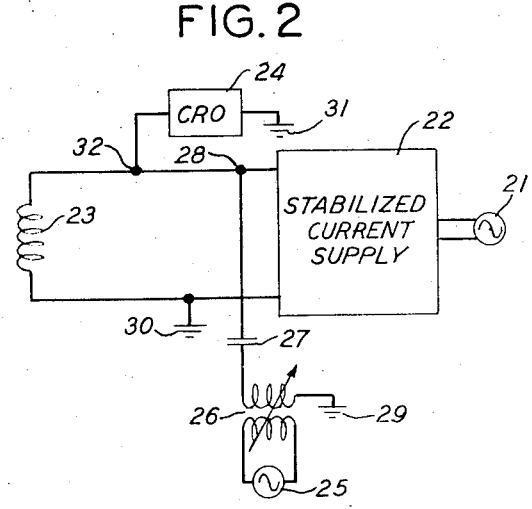
FIGS. 2 and 3 are schematic diagrams of apparatus suitable for obtaining such micrographs. In the apparatus of FIG. 2, AC voltage is injected directly across the objective lens, while in FIG. 3, AC voltage is injected into the current regulating stage of the power supply.

FIG. 2 shows a schematic arrangement of one circuit suitable for supplying current to objective lens 17, and for introducing a controllable amount of an AC component into the current. Power is supplied from 60 cycle AC mains 21, is stabilized by current supply 22 introduced into the lens coil 23, and is continuously monitored by cathode ray oscilloscope 24, connected at point 32. The separate AC component is introduced from 60 cycle AC mains 25, controlled by variable transformer 26 and capacitor 27, and introduced at point 28. Ground connections 29, 30 and 31 complete the circuit.

Figure 3:
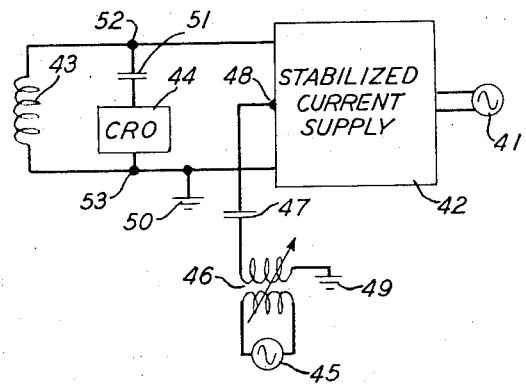

FIG. 3 shows a schematic arrangement of another circuit, similar to that of FIG. 2, in that there is correspondence between 60 cycle AC mains 21 and 41, current suppliers 22 and 42, lens coils 23 and 43, cathode ray oscilloscopes 24 and 44, 60 cycle mains 25 and 45, transformers 26 and 46, capacitors 27 and 47 and grounds 29 and 49, and 30 and 50. The circuit of FIG. 3 differs in that the separate AC component is introduced into the current supply at 48, and in that the scope 44 is connected with capacitor 51 across the lead to lens coil 43 at points 52 and 53.

The circuit arrangement of FIG. 3 may give some advantage over that of FIG. 2 in the achievement of a balanced AC component.

In practice, the first step in determining optimum conditions for a particular sample is to make a rough adjustment of the DC current to bring the lens to a condition near focus. Since injection of varying amplitudes of a periodic wave into the objective lens current often results in a shift of the DC setting away from the focused condition, it is preferable in the obtaining of optimum phase contrast to adjust the amplitude of the AC component before making fine adjustment of the DC current. Accordingly, after each incremental change in millivolts of the AC wave, the DC current must be incrementally changed until a condition of maximum contrast is obtained for that particular millivolt injection. Such DC current increments are preferred to be as small as the equipment permits. A vernier control will ordinarily allow increments corresponding to a change in focal length of about 40 angstroms and this is satisfactory for the practice of the invention. Once optimum contrast micrographs are selected for each millivolt increment of AC, they may be compared to determine the optimum millivolt injection of AC for that particular sample.

Were a completely stable, quiet supply available for lenses and accelerating potential, the benefits of AC injection would then lie in the possibility of suppressing contrast for unwanted distance in the object or for improving the signal-to-noise ratio for a distance of interest which is detrimental and not controllable except by reducing the temperature of the electron source.

Since $\Delta L_f$ he focal separation, which is needed for achieving maximum phase contrast, decreases for decreasing values of $i_o$, the object spacing, peaks of maximum phase contrast occur at closer intervals of $\Delta Lo$ which corresponds to smaller increments of injected amplitude of the AC wave. Furthermore, at small object spacings the phase contrast peaks become narrower so that smaller variations in focal separation are preferred to find such peaks.

Accordingly, it may sometimes be desirable before adjusting the lens current to first determine prominent object spacings in the sample so that the size of the periodic wave increments may be better determined.

Such is achieved by photographing a diffraction pattern of the sample in the back focal plane of the objective lens. The prevalent spacings are then easily obtained by measurements of the diffraction pattern.

Some advantage may also be gained once the proper amplitude of the periodic wave has been determined, by changing this amplitude periodically, that is, by "sweeping" it through its maximum value. For example, for a maximum amplitude corresponding to an AC injection of 4 millivolts, some advantage may be gained by sweeping the AC injection between 2 and 6 millivolts. Such may be achieved either by hand operation of the AC increment control knob or automatically by a separate circuit element if desired. The optimum sweep limits will depend upon the spacings in the object to be optimized or suppressed.

Example

For a sample of graphitized carbon black it was determined to produce micrographs showing the 3.4 angstroms spacing of graphite. AC injection increments into the lens current were made in the amounts of 1.5, 2.5 and 5 millivolts, the corresponding ripple amplitudes being about 300 angstroms, 500 angstroms and 1,000 angstroms, respectively. For each AC injection, the DC lens current was adjusted for optimum phase contrast and micrographs were taken using a Siemens Elmiskop I, modified for short focal length. Micrographs were obtained showing optimum phase contrast for AC increments of 1.5, 2.5 and 5 millivolts, respectively. The micrograph corresponding to the 2.5 millivolt injection represented conditions near maximum and shows growth defects in the form of dislocations and curvature of the planes in the lattice. The micrographs corresponding to millivolt injections of 1.5 and 5 represented conditions corresponding to positions on either side of a peak for maximum phase contrast, in which the growth defects as dislocations and curvature of the lattice planes are less distinct than in the micrograph corresponding to the 2.5 millivolt injection.

While the obtaining of optimum phase contrast has been described in terms of varying the amplitude of an AC component upon the objective lens current, it should be understood that optimum phase contrast may also be obtained by other means which are within the scope of the invention such as varying the amplitude of an AC component upon the current to at least one auxiliary coil, placed in the vicinity of the objective lens.

Furthermore, the invention is not restricted for use in electron microscopes, and may find application in other charged particle systems where it is desired to optimally focus charged particle waves.

I claim:

1. An electron microscope including a shaped-field objective lens and a circuit for supplying direct current to the objective lens, characterized in that means are included for the purpose of improving phase contrast of the microscope image, said means providing for imposing an AC component on said current, said component having a frequency in the range of from 10 to 200 cycles per second, and said means further providing for adjusting the amplitude of said component so as to result in a focal length ripple amplitude of up to 1000 angstroms.

2. The electron microscope of claim 1 in which said means comprises a variable reactance in the alternating current filtering system of the direct current supply of said circuit.

3. The electron microscope of claim 1 in which said means comprises an alternating current source separate from said circuit.

4. The electron microscope of claim 1 in which said means provides for a sinusoidally varying AC component.

5. A method for improving the phase contrast of an electron microscope image comprising (1) imposing an AC component on the objective lens direct current of said electron microscope, said component having a frequency in the range of from 10 to 200 cycles per second, (2) adjusting stepwise by a prescribed amount the amplitude of said AC component so as to result in a focal length ripple amplitude of up to 1000 angstroms, (3) adjusting stepwise the direct current to said lens until an image of optimum contrast for a given object spacing is obtained for each prescribed amplitude of the AC component, (4) and comparing the images obtained so as to determine the optimum values for amplitude of said AC component and for said direct current for said object spacing.

6. K The method of claim 5 in which the stop of adjusting stepwise the amplitude of said AC component is preceded by the stop of adjusting roughly the direct current to bring the lens to a condition near focus.